(12) United States Patent
Rosinski et al.

(10) Patent No.: US 12,128,347 B2
(45) Date of Patent: Oct. 29, 2024

(54) ENERGY EFFICIENT VPSA SYSTEM WITH DIRECT DRIVE HIGH SPEED CENTRIFUGAL COMPRESSORS

(71) Applicant: PRAXAIR TECHNOLOGY, INC., Danbury, CT (US)

(72) Inventors: Andrew C. Rosinski, Orchard Park, NY (US); Nicholas R. Stuckert, Grand Island, NY (US); Yang Luo, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 406 days.

(21) Appl. No.: 17/617,164

(22) PCT Filed: Nov. 5, 2020

(86) PCT No.: PCT/US2020/059090
§ 371 (c)(1),
(2) Date: Dec. 7, 2021

(87) PCT Pub. No.: WO2021/096752
PCT Pub. Date: May 20, 2021

(65) Prior Publication Data
US 2022/0258094 A1 Aug. 18, 2022

Related U.S. Application Data

(60) Provisional application No. 62/935,931, filed on Nov. 15, 2019.

(51) Int. Cl.
*B01D 53/04* (2006.01)
*B01D 53/047* (2006.01)

(52) U.S. Cl.
CPC ..... *B01D 53/0446* (2013.01); *B01D 53/0476* (2013.01); *B01D 2253/1085* (2013.01);
(Continued)

(58) Field of Classification Search
CPC B01D 53/04; B01D 53/0446; B01D 53/0476; B01D 53/047; B01D 2253/1085;
(Continued)

(56) References Cited

U.S. PATENT DOCUMENTS 4,197,096 A 4/1980 Sebastian et al.
5,258,056 A 11/1993 Shirley et al.
(Continued)

FOREIGN PATENT DOCUMENTS

CN 105132060 A 12/2015
KR 10-2001-0052184 A 6/2001
(Continued)

*Primary Examiner* — Frank M Lawrence, Jr.
(74) *Attorney, Agent, or Firm* — Ralph J. Mancini

(57) ABSTRACT

The invention relates to a method and system for improving PSA/VPSA plant energy efficiency during times of reduced production demand and capital efficiency through optimizing feed, vacuum, and centrifugal product compressors to achieve lower energy consumption and lower unit gas product production cost. More specifically, the present invention relates to a new energy efficient PSA/VPSA turn down process and system which employs high speed direct drive centrifugal product compressor to achieve desired production. Significant lower energy consumption can be achieved by employing lower flow, and lower adsorption top pressure in the lower production range.

15 Claims, 2 Drawing Sheets

Figure 1:
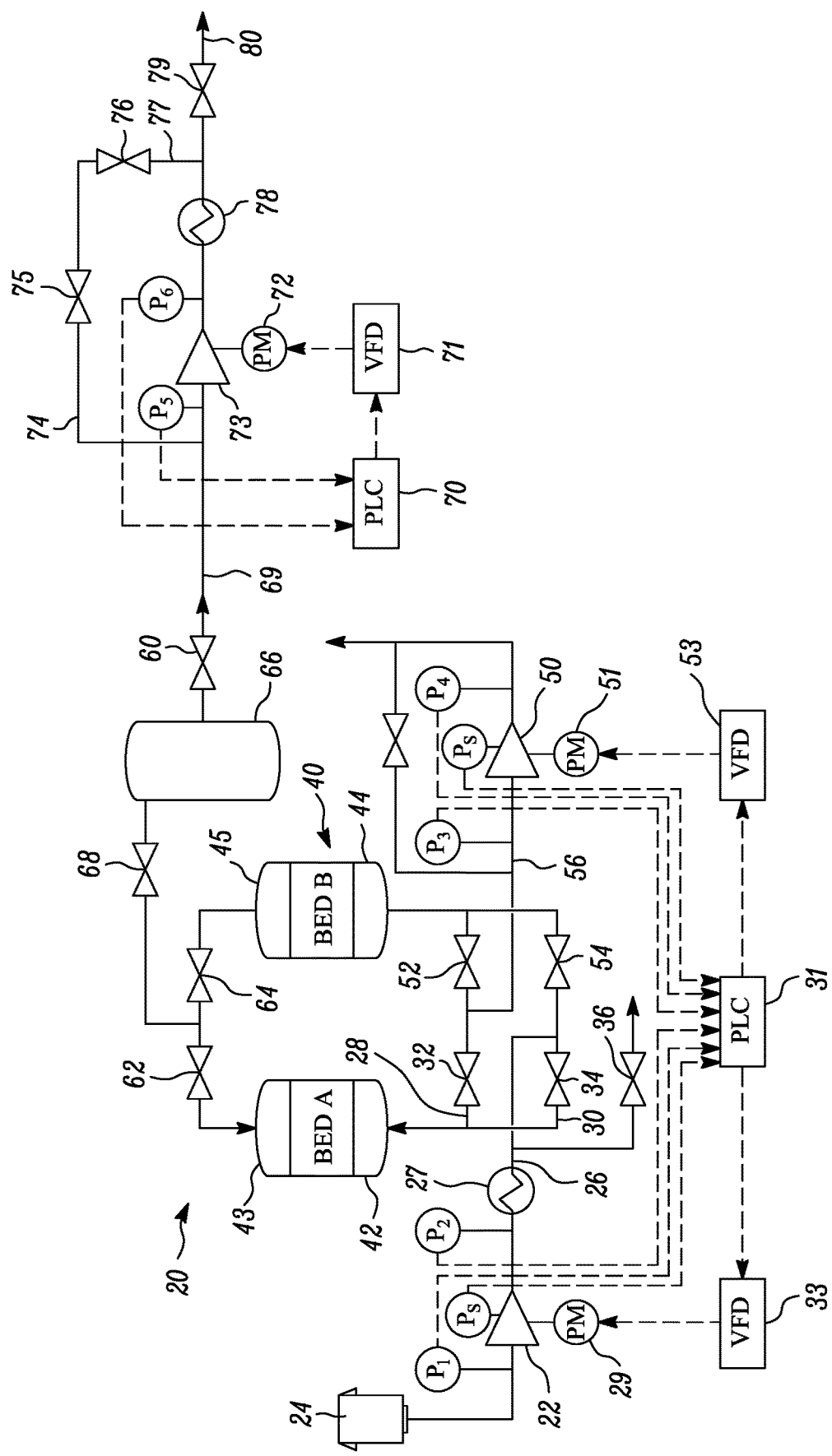

(52) U.S. Cl.
CPC .. *B01D 2257/102* (2013.01); *B01D 2257/104* (2013.01); *B01D 2259/40007* (2013.01); *B01D 2259/402* (2013.01)

(58) Field of Classification Search
CPC ........ B01D 2257/102; B01D 2257/104; B01D 2259/40007; B01D 2259/402; B01D 2259/40009; Y02C 20/40
USPC .......... 95/19, 22, 96, 130; 96/109, 113, 114, 96/115, 121
See application file for complete search history.

(56) References Cited

U.S. PATENT DOCUMENTS

| | | | |
|---|---|---|---|
| 5,555,749 A * | 9/1996 | Wehrman | B01D 53/0476 62/908 |
| 5,702,504 A | 12/1997 | Schaub et al. | |
| 6,030,435 A | 2/2000 | Monereau et al. | |
| 6,068,678 A | 5/2000 | Labasque et al. | |
| 6,146,450 A | 11/2000 | Duhayer et al. | |
| 6,506,234 B1 | 1/2003 | Ackley et al. | |
| 7,641,716 B2 | 1/2010 | Lomax, Jr. et al. | |
| 7,785,405 B2 | 8/2010 | Manning et al. | |
| 8,529,665 B2 | 9/2013 | Manning et al. | |
| 9,089,810 B2 | 7/2015 | Belanger et al. | |
| 10,105,637 B2 | 10/2018 | Hirashi et al. | |
| 10,792,610 B2 | 10/2020 | Stuckert et al. | |
| 10,799,827 B2 | 10/2020 | Stuckert et al. | |
| 2007/0039467 A1 | 2/2007 | Monereau et al. | |
| 2009/0241771 A1 | 10/2009 | Manning | |
| 2011/0277629 A1 | 11/2011 | Manning | |
| 2012/0325085 A1 | 12/2012 | Belanger et al. | |
| 2013/0283854 A1 * | 10/2013 | Wang | F25J 3/08 62/636 |
| 2014/0041521 A1 | 2/2014 | Belanger et al. | |
| 2014/0053732 A1 | 2/2014 | Manning et al. | |
| 2016/0184764 A1 * | 6/2016 | Baker | B01D 53/0476 96/116 |
| 2019/0010949 A1 | 1/2019 | Swindlehurst et al. | |

FOREIGN PATENT DOCUMENTS

| | | |
|---|---|---|
| KR | 10-2014-0034243 A | 3/2014 |
| KR | 10-2018-0061246 A | 6/2018 |

* cited by examiner

ENERGY EFFICIENT VPSA SYSTEM WITH DIRECT DRIVE HIGH SPEED CENTRIFUGAL COMPRESSORS

RELATED APPLICATIONS

This application claims the benefit of International Application No. PCT/US2020/059090, filed on Nov. 5, 2020 which claimed the benefit of U.S. Provisional Application No. 62/935,931, filed on Nov. 15, 2019, which are incorporated herein by reference.

FIELD OF THE INVENTION

The present invention generally relates to energy efficient gas separation processes and systems that utilizes direct drive variable high speed centrifugal compressors to pressurize and/or evacuate adsorbent vessels and further pressurize product gas within an adsorption type gas separation system.

BACKGROUND OF THE INVENTION

Separations of a gas from admixture with other gases are important industrial processes. In such processes the objective may be either to obtain a product gas enhanced in a gas or from which that product gas has an undesired constituent removed therefrom. For example, there are commercial scale processes to separate air into its component gases to obtain nitrogen, oxygen, and argon and for air pre-purification processes to pretreat the air prior to use in other processes such as the cryogenic separation of air into its component gases.

Air separation can be accomplished using adsorption processes, in particular, pressure swing adsorption (PSA) and vacuum pressure swing adsorption (VPSA) type processes. In PSA and VPSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to more traditional cryogenic air separation processes, adsorption processes for air separation require relatively simple equipment and are relatively easy to maintain. Adsorption processes, however, typically have lower product recovery than many cryogenic processes. For this reason, improvements in the efficiency of adsorption processes remain an important goal. One principal means of improvement is the discovery and development of better adsorbents. Some such adsorbents have led to reduced cycle times within a given adsorption process. According, new equipment capable of meeting the demands of reduced cycle times are required.

There also continues to be a demand for PSA and VPSA plants with lower power consumption. The basic process employs a selective adsorbent to remove at least one component of a gas mixture, employing four basic process steps: (1) adsorption, (2) depressurization, (3) purge and, (4) repressurization. The gas mixture containing the more readily adsorbable component and a less readily adsorbable component is passed through at least one adsorbent bed capable of selectively adsorbing the more readily adsorbable component at a predetermined (upper) adsorption pressure. The gas stream exiting the bed at this upper pressure is now concentrated in the less readily adsorbable component and is removed for example as product. When the bed becomes saturated with the readily adsorbable component, the bed is thereafter depressurized to a lower desorption pressure for the desorption of the readily adsorbable component, with this gas then discharged from the system. Some processes can include additional steps such as equalization and product pressurization.

Conventional PSA and VPSA processes employ rotary-type positive displacement blowers for either gas pressurization or evacuation in an adsorbent bed. These conventional rotary-lobe blowers typically have lower efficiencies and higher maintenance costs than centrifugal compressors, but they do adapt quite well to the oscillating nature of the pressure swing cycles. An attractive feature of rotary-lobe blowers pertaining to an adsorption process is that power consumption is proportional to system pressure requirements. The theoretical power consumption of the blower is directly proportional to the system pressure differential (i.e., has a linear relationship between power consumption and pressure). This linear power response to the system pressure requirements has made rotary-lobe blowers the compression equipment of choice for the PSA and VPSA industry. Rotary-lobe blowers, however, create strong pressure pulsations in the system. Without proper mitigation, pressure pulsations from rotary-lobe blowers are known to cause severe structural damage in downstream process equipment. Although pulsation damper vessels are normally used with rotary-lobe blowers, they do not eliminate the mismatch completely, and a considerable pressure pulsation level is always present in the system.

In the past, centrifugal compressors at fixed speeds with and without inlet guide vanes (IGVs) and with a variable-frequency drive (VFD) have been considered for PSA and VPSA processes because of their higher efficiency when compared to conventional rotary-lobe blowers. Centrifugal compressors typically need to be able to run at high speeds and follow highly dynamic pressure swing cycles while maintaining optimum efficiency to leverage high adiabatic machine efficiency. It is necessary to employ variable-speed control and/or IGV, or a combination of the two to meet variable pressure conditions. As the PSA or VPSA cycle pressure deviates from the design pressure condition of a fixed-speed centrifugal compressor, the stage efficiency deteriorates substantially, especially when operating at pressure ratios close to 1 (choking). This results in increased average power consumption and a deterioration of the overall average compressor efficiency over the PSA or VPSA cycle.

Still, this technology could not be successfully employed in the past. The use of conventional fixed-speed centrifugal compressors with and without IGVs is not ideal because of their inability to follow fast speed ramp up and down required by cyclic pressure swing adsorption process. A conventional variable-speed centrifugal compressor can have an improved operating range and improved energy savings over the use of IGVs with a reduction in flow but is unable to rapidly adapt to the transient flow conditions of the PSA or VPSA cycle (due to the large inertias of the gears and large slow running conventional induction motor).

Several advances to PSA and VPSA processes have taken place in recent years. Some of these advances include: (a) a significant reduction in the ratio of the top adsorption to bottom desorption pressures, and (b) reductions in the cycle time (typically less than one minute) leading to reduced adsorbent inventories. A significant factor to the total energy requirement of a PSA or VPSA process is this ratio of adsorption to desorption pressures. The delivery pressure during the adsorption period of a bed by the feed air compression device, as well as the suction pressure during the desorption period by an evacuation device, is constantly changing as the cycle progresses. In order to achieve the lowest possible total power consumption for a cycle such as this, it is desirable for the feed compression and evacuation devices to be operated at peak efficiency over a wide range of pressure ratios.

VPSA plants are typically designed and sized to meet maximum production requirement at highest ambient temperature conditions. However, VPSA plants often run at lower than design capacity due to changes in customer demand and ambient conditions. Typical VPSA turn down operation is achieved through extending cycle step time without changing the feed flow and adsorption and desorption pressure range. In addition, a product recirculation stream is used to ensure machine operation. Therefore, VPSA operation in turn down mode is not as energy efficient as at the design point. The goal of present invention is to improve VPSA plant energy and capital efficiency through optimizing direct drive variable speed centrifugal feed, vacuum, and product compressors to minimize initial plant capital investment and achieve low unit production costs over the life of the plant.

U.S. Pat. No. 4,197,096 teaches a method of delivering variable product at the required pressure to customer via a constant displacement compressor through a recirculating line and regulator valve.

U.S. Pat. No. 4,197,096 discloses one can improve energy consumption of VPSA system at reduced production demand by regulating the rate of vacuum pump through a positive displacement machine or a variable speed motor driven centrifugal machine. The inertial loss from operating the variable speed centrifugal compressor following VPSA cycle is significant, and out weight the efficiency gain from positive displacement machine. U.S. Pat. No. 4,197,096 does not change VPSA adsorption top pressure to reach the lower production demand. The proposed new lower top adsorption pressure turn-down method simply would not work in U.S. Pat. No. 4,197,096 disclosed invention scheme, since the positive displacement compressor employed would not be able to take lower top adsorption pressure from the VPSA and deliver the required final pressure without the recirculation line. The lower production is achieved through the recirculation line for product compressor, consequently, product compressor will always consume the same amount of power for the reduced flow as for the full flow. The VPSA adsorption top pressure for reduced production is kept the same as full production, there is no power savings expected for the feed compressor. Therefore, the turn down energy consumption from U.S. Pat. No. 4,197,096 is expected to be significantly higher than the current invention of the new turn-down method.

U.S. Pat. No. 5,258,056 teaches a pressure swing adsorption process and system to make variable production demand by adjusting feed flow rate for a given impurity level. The turn down of the production is achieved by only varying the feed flow through a control valve based on the feedback of the measured product purity. There is no change for the adsorption pressures and or adsorption and desorption pressure ratio. This is different from the proposed turn down method wherein feed flow, adsorption pressure, adsorption and desorption pressure ratio are adjusted to realize the lowest energy separation power at the reduced production while meeting product purity requirement.

U.S. Pat. No. 6,030,435 teaches a regulation method for a pressure swing adsorption process to achieve PSA optimum performance. The main invention is to regulate the feed flow temperature so that the adsorption system maintains the optimal temperature for peak performance. One approach of regulating the feed temperature is to varying the adsorption pressure while maintaining the same production demand. The regulation method from U.S. Pat. No. 6,030,435 illustrates adjusting adsorption pressure could have minor improvement for PSA performance. However, only varying the top adsorption pressure provides limited energy efficiency for the reduced production demand while meeting product purity requirement. The proposed of simultaneously adjusting feed flow, adsorption pressure, adsorption and desorption pressure ratio provides significantly more improved energy efficiency.

U.S. Pat. No. 7,641,716 describes a throttling methodology to maintain a constant feed. This consists of valves located before the system to keep the flow rate at the optimal rate to achieve peak performance for the system. This patent teaches a general operating practice in (V)PSA of control constant feed flow into the system to maintain optimum performance.

SUMMARY OF THE INVENTION

The present invention relates to a method and system for improving VPSA plant energy at reduced production capacity and capital efficiency through optimizing feed, vacuum, and centrifugal product compressors to achieve lower energy consumption and lower unit gas product production cost. More specifically, the present invention relates to a new energy efficient VPSA turn down process and system which employs high speed direct drive centrifugal product compressor to achieve desired production. Significant lower energy consumption can be achieved by employing lower flow, and lower adsorption top pressure for in the lower production range.

DETAILED DESCRIPTION OF THE FIGURES

Figure 2:
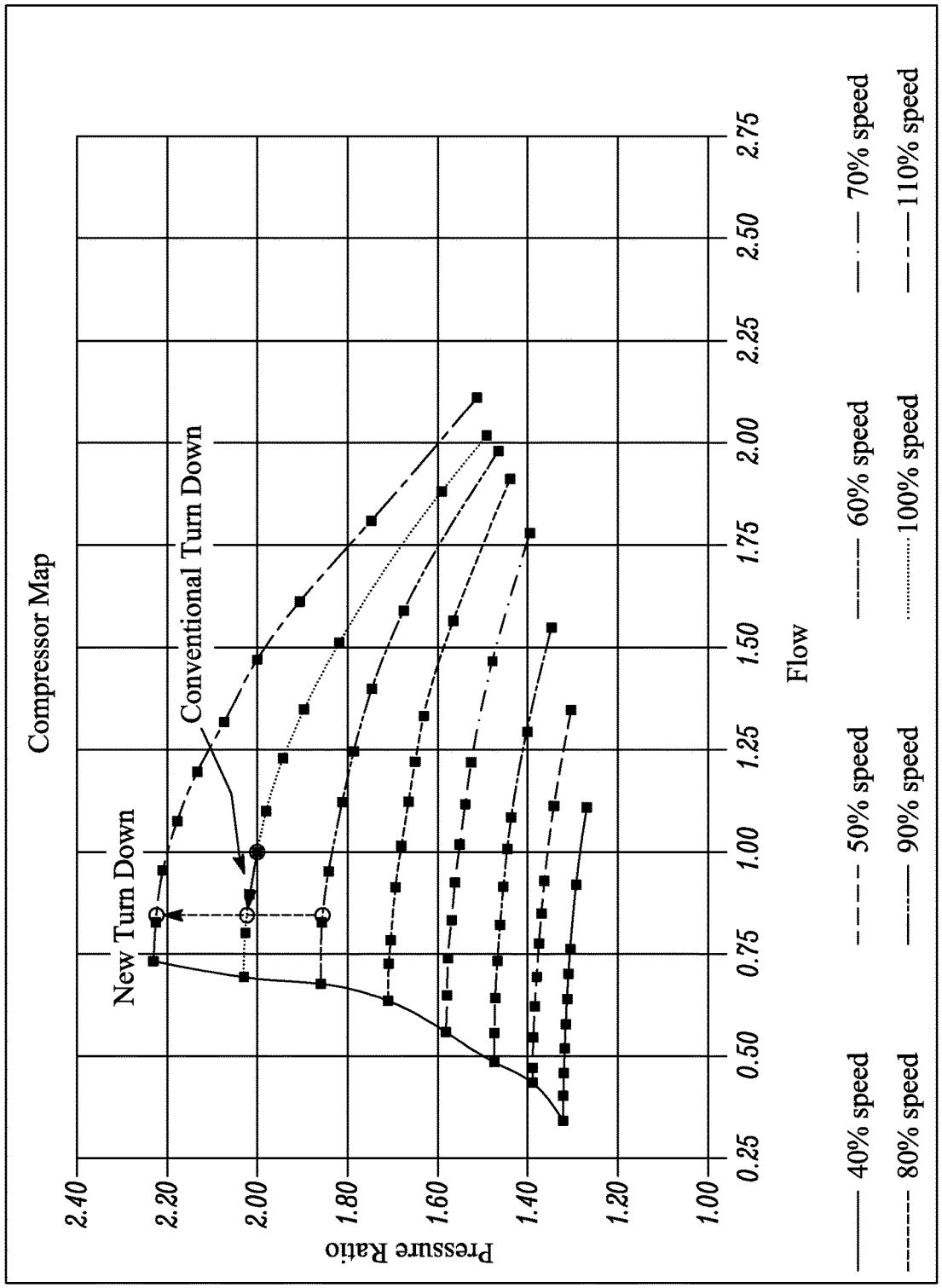

FIG. 1 depicts a VPSA Process Flow Diagram.
FIG. 2 shows a compressor map for an oxygen product compressor.

DETAILED DESCRIPTION OF THE INVENTION

Centrifugal technology is based on dynamic compression. In a dynamic compressor, gas, such as air, oxygen, nitrogen, or other gases, is drawn between the blades of a rapidly rotating impeller and accelerates to high velocity. The air is then discharged through a diffuser where the kinetic energy is transformed into static pressure. Most dynamic compressors are turbo compressors with an axial or radial flow pattern and are designed for larger volume flow rates. The performance of a dynamic compressor is very much dependent on environmental conditions such as:

1) Inlet temperature
2) Inlet pressure
3) Relative humidity (RH)
4) Cooling water temperature Decreasing the inlet temperature of the air increases air density resulting in higher free air delivery (Actual Cubic per Minute, ACFM), higher power consumption of the compressor and higher available turndown range. Likewise, increasing inlet temperature of the air decreases air density resulting in lower free air delivery (ACFM), lower power consumption of the compressor and smaller available turndown range.

A decrease in inlet pressure will reduce the density of the air at the compressor intake. As with higher temperatures, it will result in lower free air delivery, lower power consumption and smaller available turndown. And increase in inlet pressure will increase the density of the air at the compressor intake, resulting in result in higher free air delivery, higher power consumption and higher available turndown.

The addition of water vapor to the air makes air humid and reduces the density of the air. This is due to the molar mass of water being less than that of air. Accordingly, an increase in relative humidity reduces flow and power, and a decrease in RH will increase flow and power.

Finally, the cooling water temperatures affect the intake such that colder water increases flow and power, and warmer water reduces flow and power.

PSA/VPSA plants are typically designed and sized to meet maximum production requirement at highest ambient temperature conditions. However, PSA/VPSA plants often run at lower than design capacity due to changes in customer demand and ambient conditions, reducing the efficiency of the turn down operation.

To improve the plant energy efficiency when customer demand is lower than the design capacity, the present invention proposes a new turn down method whereby the flow and top adsorption pressure are lowered to achieve lower unit energy consumption. With the lower flow and lower inlet suction pressure to the product compressor, the final desired product pressure can be achieved through increasing motor speed and increasing stage pressure ratio(s) with variable speed controlled centrifugal compressor driven by either high speed permanent magnet motor or induction motor. The proposed process and system are beneficial for PSA/VPSA plants that employ either Roots or centrifugal feed and/or vacuum compressors, but most benefits are expected from the plants employing centrifugal machines.

In another embodiment the invention relates to a method for operating an adsorption system for gas separation said system comprising:
 a. at least one vessel containing at least one adsorption bed comprising at least one adsorption material, wherein the at least one bed is configured for cyclical pressurization and depressurization during operation;
 b. at least one compressor configured to be driven by an associated motor comprising a direct drive high-speed permanent magnet or high-speed induction motor designed for variable-speed operation; and
 c. means for receiving data signals for conditions in the system and for communicating to the high-speed induction motor driving the at least one centrifugal compressor in response to the conditions such that the at least one centrifugal compressor can operate at a designated speed; and
 d. a product compressor configured to deliver the desired product pressure at average and peak production capacity,
wherein during times of reduced product demand, said method comprises lowering the top adsorption pressure to a range of from about 75% to 90% of design operation pressure of said at least one adsorption vessel to lower production capacity while achieving higher energy efficiency.

From Table 1 it can be seen that reducing the top pressure to 90% of design operational top pressure reduces production to 80% of normal production. Normal production refers to contract specified oxygen production of the system.

The design operational top pressure is defined as the maximum pressure achieved by any vessel during a cycle in order to achieve contract specified oxygen production (within a 5% margin) at contract specified power consumption (within a 5% margin) during contract specified ambient conditions (Temperature+/−2 C, pressure+/−0.05 bar, humidity (+/−15%, etc.). This usually corresponds to the lowest cost of production of oxygen with a given set of equipment. In this invention, the novel benefit is that during times of reduced consumption the claimed method reduces the relative power consumption of the system by fully utilizing the system capital. The operating costs are now lower with this new method, and substantially lower than traditional methods to operate at reduction production compared to the contract design case.

Feed unload time is the time that the feed compressor vents to atmosphere. The feed unload step is the step where the feed compressor is venting to atmosphere. In common operation, adsorbent vessels typically engage in an equalization step at this time where gas from one vessel is passed to a second vessel or to a tank that can hold the gas.

Pressure ratio for VPSA is 2.3 to 6 with typical range of 2.5 to 3.5. Pressure ratio for PSA is 3 to 8 with typical range of 4-6.

In some embodiments, at least one adsorbent bed is cyclically pressurized by at least one feed compressor and sometimes evacuated by at least one vacuum compressor, with at least one feed compressor or the at least one vacuum compressor being a centrifugal compressor driven by an associated high-speed induction motor designed for variable high-speed operation. In such embodiments, the compressor that is not a centrifugal compressor can be a rotary-lobe blower driven by the induction motor.

In some embodiments of the present invention, the adsorbent bed is cyclically pressurized by at least one feed centrifugal compressor driven by an associated high-speed induction variable-speed motor and, evacuated by at least one vacuum centrifugal compressor driven by an associated high-speed induction variable-speed motor. More specifically and in accordance with the present invention, the centrifugal feed compressor(s) and/or centrifugal vacuum compressor(s) are driven by direct drive high-speed induction motors for variable-speed operation such that the compressor and high-speed induction motor combination(s) can accelerate from low-speed to high-speed and decelerate from high-speed to low-speed in rapid rates required by shorter cycle times of current PSA or VPSA systems and processes.

Use of variable-speed controlled high-speed permanent magnet or induction motors allows for an order of magnitude improvement over conventional low-speed induction motor/gearbox systems in their ability to accelerate and slow down the centrifugal compressor in a PSA or VPSA process. Using high-speed motors allows for the elimination of the necessity for gearboxes and thus likewise allows for the elimination of the necessity of lube oil systems. The centrifugal compressor(s) can thus be supported on oil free bearings. Furthermore, in some embodiments, the proposed drive systems of the present invention are expected to be more efficient by over 7 percentage points with the elimination of gear and bearing oil friction losses, lube oil system losses, and an improved ability to lead/lag power.

To achieve the high efficiency of centrifugal compressors, it is essential that the compressors are operated along a peak efficiency line. The peak efficiency line is a line drawn on a compressor performance map. As discussed herein, a compressor performance map (pressure ratio vs. mass flow at various speeds) is generated from the isentropic work coefficient at various speeds for a specific inlet temperature to the compressor. The peak efficiency line represents the loci of points that correspond to all the peak efficiency points of the compressor operating curves at different speeds. By operating along the peak efficiency line, the compressor(s) can be operated at its most efficient mode in terms of power consumption.

The performance map(s) can also be in the form of lookup or reference tables generated from the isentropic work coefficient. The performance maps and resulting best efficiency lines can be stored in a programmable logic controller (PLC) and integrated with the PSA and or VPSA systems.

While not to be construed as limiting, the present invention is implemented in PSA or VPSA adsorption processes that separate gases, such as air into oxygen and nitrogen. Other gas separations processes that can benefit from the use of the present invention include, but are not limited to, PSA and or VPSA separations involving the recovery of gases such as $O_2$, $N_2$, $CO_2$, $H_2$ or He.

A VPSA plant typically has 3 pieces of rotating equipment as illustrated in FIG. 1. A feed machine (22) provides air to the plant. The air is separated to produce oxygen. A vacuum machine (50) removes waste nitrogen from the plant. A product compressor (73) boosts the oxygen pressure from the plant to the customers desired supply pressure. Typically, the feed and vacuum machines are roots style rotary blowers. These machines operate at fixed speed and flow capacity cannot be changed once installed. Therefore, once a VPSA is designed and built the amount of oxygen produced cannot be increased. Typically, for single stage compression the product compressor is either a reciprocating compressor or fixed speed centrifugal compressor. Like the traditional feed and vacuum machines, the traditional product compressors, once selected and installed, cannot be adjusted to increase oxygen capacity. If less oxygen product is needed, compressor will be operated in recirculation mode through recirculation line (77) along with recirculation control valves (75,76), and machine will consume the same amount of power as if it is producing 100% of the capacity. In other words, capacity turn down will not yield any power savings from the product compressor.

VPSA plants are conventionally designed to meet maximum production requirements even though customers often require lesser amount of oxygen production most of the time. Consequently, VPSA plants are routinely operated at turn down mode. Having an energy efficient turn down method enables VPSA plant to achieve high energy efficiency over operating window of plant and reduces the energy cost.

Typical VPSA plant turn down operation is accomplished through intermittently running the plant by extending certain cycle step time without changing the feed flow, adsorption and desorption pressure range. This mode of operation has inherently higher unit power since the motor and compressor are still running while the system is not producing product. Alternatives are to turn the motor and compressor off when the plant is not running however this is neither practiced nor preferred because of machine control and wear from frequent startup and shutdowns due to the short VPSA cycle steps.

Conventional VPSA turn down is accomplished through feeding the same amount of flow and extending the cycle time. If the goal is to produce 80% of oxygen product, one can use the conventional VPSA turn down method by simply extending the cycle time while keeping the feed flow and top pressure the same, the energy consumption and oxygen recovery from turn down is less than the normal production. In other words, tune down performance is not as efficient as if the plant is producing 100% production.

An improved more energy efficient method of producing, as an example, 80% oxygen product is to lower top adsorption pressure. One skilled in the art would typically expect low top pressure would yield negative VPSA performance results, since the adsorption capacity is reduced at lower top adsorption pressure. To compensate the lower adsorption capacity from the lower top pressure, one has to increase the feed flow and shorten the cycle, both would contribute to the negative recovery impact. However, the energy saving benefit from the lower top pressure surprisingly out weights the negative impacts of recovery drop from the increased feed flow and shorter cycle.

A further improvement to the turn down method is to provide lower feed flow and reduce top pressure to take advantage of reduced feed velocity to the adsorbent vessel to maximize the recovery. The lower top pressure from the adsorbent vessel translates into the lower suction pressure of the oxygen product compressor. By employing the direct drive variable high speed centrifugal product compressor, one can speed up the motor to increase the pressure ratio from the compressor, therefore achieve the same product pressure as if the suction pressure remains the same level.

In a VPSA system, the top pressure of the adsorbent vessel can be lowered while maintaining control over the product flow rate by reducing the pressure restriction in the system. This can be accomplished by increasing the opening of product control valve 68 (at all times), valve 62/64 (during product make of the corresponding bed) or valve 60 (during product make) further. This will inherently increase the flow rate which can to be balanced by increasing the feed unload time. This can be done by decreasing total adsorption/product make step time or increasing the feed unload step time. Increasing the feed unload step time has the side effect of lowering the vacuum pressure, which may be desirable in some situations where the system may run more efficiently. This is plant specific and evaluated on a case by case basis as it can be affected by adsorbent characteristics, loading procedure, vessel construction, plant piping layout, etc. If a product centrifugal compressor is being used, this product machine speed can be increased to enable a lower suction pressure. This can be used in combination with or before changing the pressure restriction in valves 68, 62/64 or 60. Flow rate balancing will still need to be accomplished by adjusting the feed unload time.

Additional top pressure and flowrate adjustment can be accomplished if the VPSA feed/vacuum compressors are variable, one example being a centrifugal compressor with a variable frequency drive. In these cases, the compressor(s) can be slowed to produce a lower pressure ratio while still maintaining a constant flowrate. In order to balance the lower top pressure either valves 68, 62/64 or 60 or a centrifugal product compressor or some combination therein must still be adjusted. But the cycle timing does not need to change to balance the flowrate as the machine is adjusting the flowrate already. Adjustments in a PSA system are substantially the same with the exception that a PSA system does not have a vacuum compressor.

Additional top pressure and flowrate adjustment can be accomplished if the VPSA feed/vacuum compressors are variable, one example being a centrifugal compressor with a variable frequency drive. In these cases, the compressor(s) can be slowed to produce a lower pressure ratio while still maintaining a constant flowrate.

If a product centrifugal compressor is being used, this product machine speed can be increased to enable a lower suction pressure. This can be used in combination with or before changing the pressure restriction in valves 68, 62/64 or 60 shown in FIG. 1. Flow rate balancing will still need to be accomplished by adjust the feed unload time.

The new proposed turn down method achieves significant energy consumption reduction over conventional constant feed flow turn down method as illustrated by simulation results in Table 1.

TABLE 1

VPSA performance summary of turndown methods:

| Turn Down Methods | Feed Flow Air | Production Oxygen | Top Pressure | Unit Power KW/ MTPD O2 | Cycle Time Sec | Recovery |
|---|---|---|---|---|---|---|
| VPSA | 100% | 100% | 100% | 100% | 100% | 100% |
| VPSA-Traditional TD | 100% | 80% | 100% | 110% | 140% | 96% |
| VPSA-New TD Lower Top P, More Feed F | 110% | 80% | 90% | 95% | 70% | 90% |
| VPSA-New TD Lower Top P, Lower Feed F | 75% | 80% | 90% | 85% | 100% | 105% |

The invention can be implemented in a (Vacuum) Pressure Swing Adsorption system with various PSA/VSA/VPSA cycles. A pressure swing adsorption system separates components of a feed gas mixture into at least a first component and a second component by selective adsorption of said first component into a bed of adsorbent. The pressure swing adsorption cycle consists of the basic steps of raising the pressure of feed gas during adsorption steps to an adsorption top pressure so as to enable adsorption of first component, depressurizing said bed during the desorption steps to a desorption pressure.

The desired low pressure is > than about 0.1 atm and the desired high pressure is < about 100 atm. In another embodiment the low pressure in the cycle is ≥0.3 atm and the high pressure in the cycle that is ≤6 atm.

A ratio of pressures of said adsorption pressure to said desorption pressure for oxygen VPSA referenced in this invention is typically less than 6.0, in one embodiment ranging from about 1.5 to about 6, in another embodiment from about 1.5 to about 3.5.

The PSA/VPSA systems which the proposed turn down method are beneficial can comprise a single adsorption bed, two adsorption beds in a single train, wherein one adsorption bed is in feed mode while the other adsorption bed is in regeneration mode, or multiple adsorption beds beyond two beds.

A variety of adsorbents can be used in the process of the invention. In one embodiment a LiX adsorbent can be used. In another embodiment any faujasite type with any cation of Li, Ca, Na, K or mixed cation configuration can be employed. This invention works with high rate adsorbents defined as a mass transfer coefficient of >=12/s and an intrinsic $N_2$ diffusivity of ≥3.5×10$^{-6}$ m2/s at 1.5 bar and 300 k.

The percent energy improvement will be impacted by the base system configuration and referenced adsorbent, and compression machine efficiencies. The above simulations results are illustrative of the invention using LiX adsorbent with exhibiting a mass transfer coefficient of >=12/s and an intrinsic $N_2$ diffusivity of ≥3.5×10$^{-6}$ m$^2$/s at 1.5 bar and 300 k for achieving oxygen product from air feed.

Various alternatives and modifications can be devised by those skilled in the art without departing from the invention. Accordingly, the present invention is intended to embrace all such alternatives, modifications and variances which fall within the scope of the appended claims.

With the lower top pressure from the adsorb vessel, the suction pressure to the product compressor will be lower than if VPSA employs the conventional constant feed and constant top adsorption pressure methods.

With the lower flow and inlet suction pressure into the product compressor, the final desired pressure can be achieved through increased motor speed and increased stage pressure ratio. For the centrifugal product compressor with high speed motor and VFD, the compressor operates at the design point of the compressor (pressure, flow, and speed). one can increase the flow from this machine by increasing the speed while maintaining the same outlet pressure.

FIG. 2 shows a compressor map for an oxygen product compressor. The design point for the compressor is shown on the map. The design point includes a flow, pressure ratio, and speed that the wheel is designed to operate at to meet the process requirements. For typical compressors using fixed speed motor and gear box, the compressor operates at or near this design point. For compressors drive by high-speed motors and VFD as described in the patent, the compressor can operate over the entire map. The compressor can also be operated at higher flow at the same head by increasing the speed of the motor. This provides the flexibility to design a compressor for a certain flow and pressure but operate at a higher flow if production requirements change.

For a centrifugal compressor with high-speed motor and VFD, the compressor can speed up with lower flow to increase the pressure ratio and achieve the desired higher final pressure. This concept is shown in FIG. 2. At 80% of flow, compressor with 90% speed can deliver pressure ratio of 1.85. If compressor speed is increased to 110%, the pressure ratio can be increased to 2.22. By increasing the pressure ratio through the increasing speed of the motor, the final product pressure can be achieved. This method of turn down of increasing pressure ratio at lower flow is fundamentally more energy efficient than the traditional turn down method of recirculating part of product.

For a single stage direct drive high speed centrifugal compressor, the range of the turn down may be extended through the combination of varying compressor speed and varying recirculation flow to address the reduced feed flow and lower suction pressure.

The turn down range can be extended by employing inlet guide vane and varying angles of the inlet guide vane.

The described turn method of increasing motor speed and increasing compressor stage pressure ratio can be extended to multiple stage compressors with further extended operating range.

With lower feed flow and lower suction pressure, one can lower the first stage pressure ratio, increase pressure ratios for second and/or third stages to achieve the desired final pressure. Pressure ratio change can be accomplished through varying compressor speeds through direct drive high speed motor.

We claim:

1. A method for improving the energy efficiency of adsorptive gas separation system during the times of reduced product demand, wherein system comprises:
   a. at least one vessel containing at least one adsorption bed comprising at least one adsorption material, and
   b. at least one compressor, wherein the at least one adsorption bed is configured for cyclical pressurization and depressurization during operation for separation of components of a feed gas mixture into at least a first component and a second component by selective adsorption of said first component into said adsorption bed comprising at least one adsorbent, said method comprising the following steps on a cyclic basis:

I. raising the pressure of a feed gas to said bed during the adsorption steps of the cycle to an adsorption pressure so as to enable adsorption of said first component by said adsorbent, said adsorbent exhibiting a mass transfer coefficient of $>=12/s$ and an intrinsic N2 diffusivity of $\geq 3.5 \times 10^{-6}$ m2/s at 1.5 bar and 300 k, II. depressurizing said bed during the desorption steps of said cycle to a desorption pressure so as to desorb said first component from said adsorbent, the ratio of pressures of said adsorption pressure to said desorption pressure in a range of from about 1.5 to 6.0;

wherein during times of reduced product demand, said method comprises lowering the top adsorption pressure to a range of from about 75% to 90% of design maximum operation pressure of said at least one adsorption vessel to lower production capacity while achieving higher energy efficiency.

2. The method of claim 1, wherein the system is a PSA or a VPSA system configured to recover at least one gas selected from the group consisting of: $O_2$, $N_2$, $CO_2$, $H_2$, Ar, and helium.

3. The method of claim 2, wherein said intrinsic N2 diffusivity of said adsorbent for said first component is equal to or greater than $4.0 \times 10^{-6}$ m$^2$/see at 1.5 bar and 300 k and said ratio of the adsorption pressure to the desorption pressure ranges from about 1.5 to about 3.5 for a VPSA system and from about 3.0 to about 6.0 in a PSA system.

4. The method of claim 2, wherein said feed gas is air, said first component is nitrogen and said second component is oxygen, wherein said adsorbent is selected from the group consisting of a type X zeolite with a SiO2/Al2 O3 ratio less than or equal to 2.5 and exchanged with Li (>70%), a faujasite type zeolite exchanged with any cation of Li, Ca, Na, K, and a mixed cation configuration of said faujasite zeolite.

5. The method of claim 1 which comprises one or more beds in series or parallel, wherein at least one bed in feed mode while the others are in regeneration mode and wherein the said at least one compressor is a positive displacement compressor, a rotodynamic compressor or centrifugal compressor.

6. The method of claim 5 wherein the said at least one compressor is a positive displacement compressor, wherein the top adsorbent vessel pressure of said at least one adsorbent vessel is lowered while maintaining control over the product flow rate by reducing the pressure restriction in the system by increasing the opening of product control, product make and/or equalization valves.

7. The method of claim 6 wherein said at least one compressor is driven by an associated motor, wherein the at least one compressor is a rotary-lobe blower and the associated motor is an induction motor.

8. The method of claim 5 wherein said at least one compressor is a centrifugal feed compressor optionally comprising inlet guide vanes, wherein the top pressure of said at least one adsorbent vessel is lowered by lowering the feed flow to the adsorption vessel, wherein said lower feed flow is achieved by lowering compressor speed of said centrifugal compressor, or adjusting the angles of inlet guide vanes of said compressor, or a combination of both.

9. A method for operating a PSA or VPSA adsorption system for gas separation said system comprising:
   a. at least one vessel containing at least one adsorption bed comprising at least one adsorption material, wherein the at least one bed is configured for cyclical pressurization and depressurization during operation;
   b. at least one centrifugal compressor driven by a variable speed direct drive high-speed permanent magnet motor or high-speed induction motor; and
   c. adjusting the speed of said at least one centrifugal compressor in response to data signals for conditions in the system such that the at least one centrifugal compressor can operate at a designated speed; and
   d. a product compressor configured to deliver the desired product pressure at average and peak production capacity, wherein during times of reduced product demand, said method comprises lowering the top adsorption pressure to a range of from about 75% to 90% of design operation pressure of said at least one adsorption vessel to lower production capacity while achieving higher energy efficiency.

10. The method of claim 9 wherein the said product compressor is a centrifugal compressor driven by direct drive, high-speed permanent magnetic motor or high-speed induction motor, and the speed and pressure ratio of the said compressor can be increased to achieve the desired product pressure and flow.

11. The method of claim 9 wherein the said at least one centrifugal compressor is a positive displacement compressor, wherein the top adsorbent vessel pressure of said at least one adsorbent vessel is lowered while maintaining control over the product flow rate by reducing the pressure restriction in the system by increasing the opening of product control, product make and/or equalization valves.

12. The method of claim 10 wherein said at least one centrifugal compressor is a centrifugal feed compressor optionally comprising inlet guide vanes, wherein when product demand is lower than the average production requirements of the system the top pressure of said at least one adsorbent vessel is lowered by lowering the feed flow to the adsorption vessel, wherein said lower feed flow is achieved by lowering compressor speed of said centrifugal compressor, or adjusting the angles of inlet guide vanes of said compressor, or a combination of both.

13. The method of claim 9, wherein the PSA or VPSA system comprises a system for recovering at least one gas selected from the group comprising: $O_2$, $N_2$, $CO_2$, $H_2$, Ar, or helium.

14. The method of claim 13 wherein said system is a VPSA system and a turn down energy efficiency for said VPSA process is improved by lowering the top adsorption pressure in said system, increasing feed flow to the system and/or lowering cycle time.

15. The method of claim 14 wherein turn down range is extended through direct drive high-speed direct drive VFD controlled multiple stage centrifugal compressor, the employment of inlet guide vane, control of the angle of inlet guide vane, varying stage pressure ratio via varying stage speeds, or combination of the any above.

* * * * *